United States Patent [19]

Morita et al.

[11] Patent Number: 5,331,616
[45] Date of Patent: Jul. 19, 1994

[54] INFORMATION RECORDING AND REPRODUCING APPARATUS WITH SELF-DIAGNOSIS INFORMATION STORAGE MECHANISM

[75] Inventors: Shimya Morita; Fumiyoshi Abe, both of Kanagawa, Japan

[73] Assignee: Sony Corporation, Tokyo, Japan

[21] Appl. No.: 44,510

[22] Filed: Apr. 9, 1993

[30] Foreign Application Priority Data

Apr. 17, 1992 [JP] Japan .................................. 4-122803

[51] Int. Cl.⁵ .............................................. G11B 7/00
[52] U.S. Cl. .................................. 369/53; 369/44.32; 369/47; 369/54; 369/58; 360/31
[58] Field of Search ....................... 360/25, 27, 31, 55, 360/60, 69; 369/44.32, 47, 50, 53–54, 58, 111, 124; 324/210, 212, 226, 227

[56] References Cited

U.S. PATENT DOCUMENTS

| | | | |
|---|---|---|---|
| 4,949,036 | 8/1990 | Bezinque et al. | 360/31 X |
| 5,075,804 | 12/1991 | Deyring | 369/48 X |
| 5,212,677 | 5/1993 | Shimote et al. | 369/58 |
| 5,233,584 | 8/1993 | Kulakowski et al. | 369/58 X |
| 5,233,591 | 8/1993 | Nishihara | 369/54 |
| 5,280,395 | 1/1994 | Matsuzaki | 360/31 |

Primary Examiner—W. R. Young
Attorney, Agent, or Firm—William S. Frommer; Alvin Sinderbrand

[57] ABSTRACT

An information recording and reproducing apparatus having a self-diagnosis information storage mechanism is provided. This apparatus stores self-diagnosis information without increasing the storage capacity thereof and erasing important error information. According to the present invention, any inconforming of the apparatus itself or the quality of a signal recorded in the recording medium and error information regarding thereon is stored in a memory through discrimination/control device so that the information is read out from outside and at the same time, when a vital error occurs, storage of error information thereafter is inhibited while, as regards, information not stored, only the logic sum thereof is stored.

6 Claims, 4 Drawing Sheets

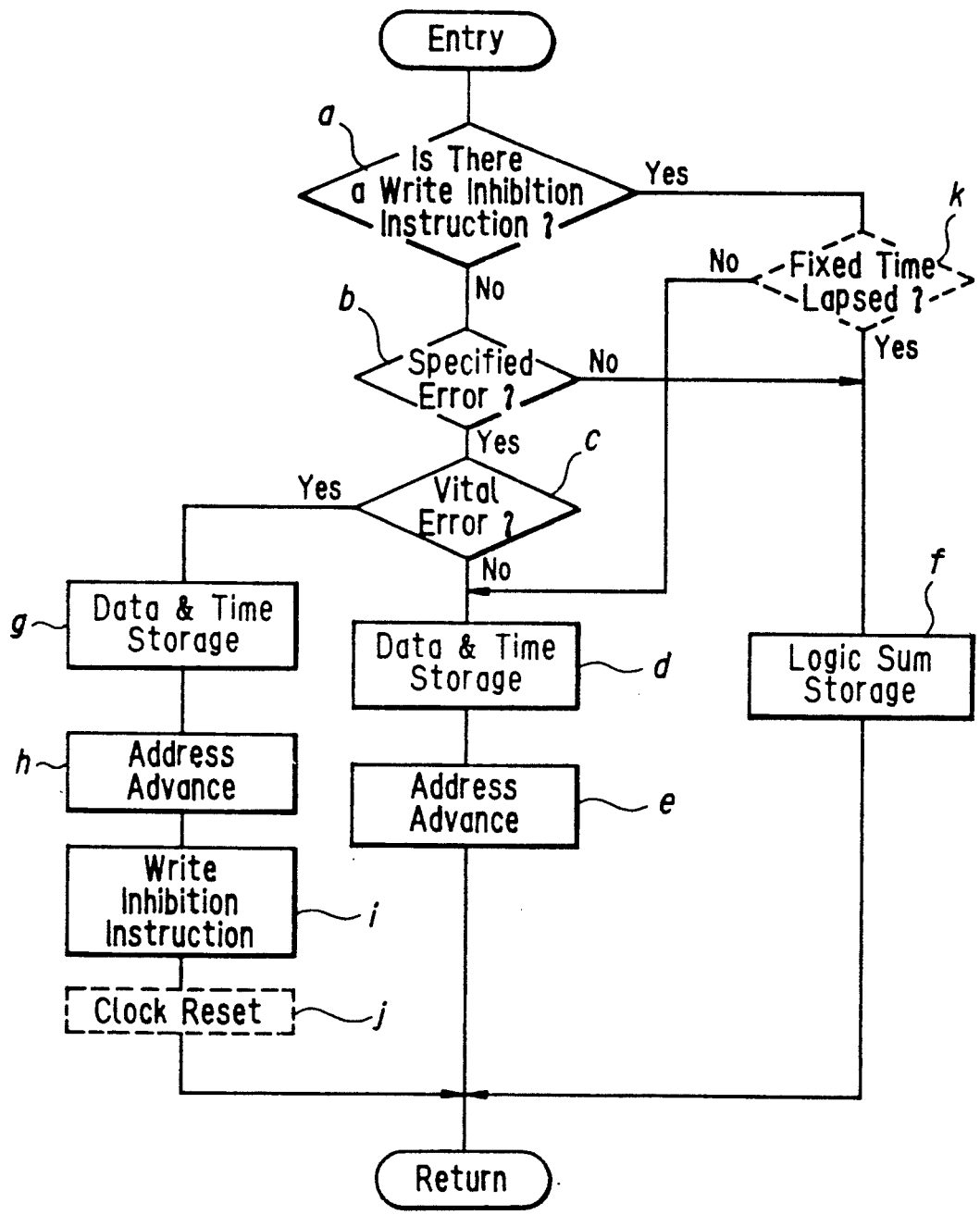

INFORMATION RECORDING AND REPRODUCING APPARATUS WITH SELF-DIAGNOSIS INFORMATION STORAGE MECHANISM

BACKGROUND OF THE INVENTION

The present invention relates to information recording and reproduction apparatuses such as data recorders, digital VTRs, DATs, optical disks, etc., and more particularly to such type of apparatus that is digital information recording and provided with a self-diagnosis information storage mechanism.

Conventionally, in the case of self-diagnosis of a DVR or DCR type digital recorder system for broadcasting, it has been practiced that when an error occurs in the recorder system or memory data, the error information and a time code for the time at which the error occurred are stored in the main body so that they can be read out by a control panel operation. In this case, although the generated error information is stored in a predetermined memory, since the capacity of this memory is limited, a method is employed wherein when the memory is full of data, they are erased in sequence from the oldest one.

Now, when a vital inconformity occurs which generally causes the operation of a recorder to cease, there occur various types of errors associated therewith. For example, if the reel motor cases to rotate while the tape is travelling, it is expected that after detecting the "reel motor failure," failures such as "undesired tape travelling," "data-read-after-write collation failure," "ID (an identification signal such as a time code showing the position of data recorded on the tape) read error," etc., will take place in sequence.

In addition, it is general that, if a recorder stops, the user often checks whether the power supply is properly connected, or tries to extract the tape, or is otherwise compelled to try to restart the recorder, and in such a case as this, even if the abnormal state is correctly identified in the first instance, the next time the recorder is connected, the result may be "tape doesn't move," and an erroneous judgment may be made.

Thus the conventional methods have had the problem that the memory becomes full due to the recording of non-essential errors such as incidental errors, errors generated when the user turns on the power again and the most important "initial vital errors" are erased by an overwrite.

In order to avoid this, methods such as mounting a memory with enough capacity not to fill up even if many errors occur, or providing a separate memory for storing transferred data at the time of generation of an abnormality (refer to Japanese Laid-Open Patent Publication No. 1-243103), etc. can be considered, but in either case there are disadvantages associated with increases in the cost and size of the apparatus.

Therefore, an object of the present invention is to obtain an information recording and reproduction apparatus having a memory mechanism for self-diagnosis information in which the memory capacity does not need to be increased and error information does not need to be erased.

SUMMARY OF THE INVENTION

The information recording and reproduction apparatus having a storage mechanism for self-diagnosis information according to the present invention is so constructed that as shown in the block diagram of FIG. 1, a discrimination and control means 3 receives error information from a first detection means 1 for detecting abnormalities in the main body 10 of the apparatus and a second detection means 2 for detecting the acceptability of signals stored in a recording medium, records them in a back-up memory 4 and reads them out whenever required via an exterior readout means 5. Thus, when a vital error occurs, it is detected by a vital abnormality discrimination function 3-1, whereafter the storage of error information is stopped by write inhibition function 3-2 and only the logic sum of non-stored information is recorded by a logic memory function 3-3.

By equipping the write inhibition function 3-2 with a delay, it is also made possible that after a vital error is generated, error information within a fixed period is renewed and some subsequent information retained, while storage of error information thereafter is inhibited.

According to this structure, if a vital error occurs, since writing into the memory 4 is inhibited, important error information is not erased. Further, regarding subsequent errors, since only the logic sums of the error information are retained, the situation after the event can be grasped to a certain extent, without increasing the capacity of the memory 4.

In addition, when renewing error information within a predetermined period after a vital error is generated, the effectiveness of analysis of the cause of generation of the abnormality can be increased by using this subsequent information.

BRIEF DESCRIPTION OF THE DRAWINGS

FIG. 4 is a flow chart showing one example of software realizing a discrimination/control function according to the present invention.

PREFERRED EMBODIMENT OF THE INVENTION

A preferred embodiment of the present invention in which the concept of the present invention is applied to a data recorder will now be described.

Figure 1:
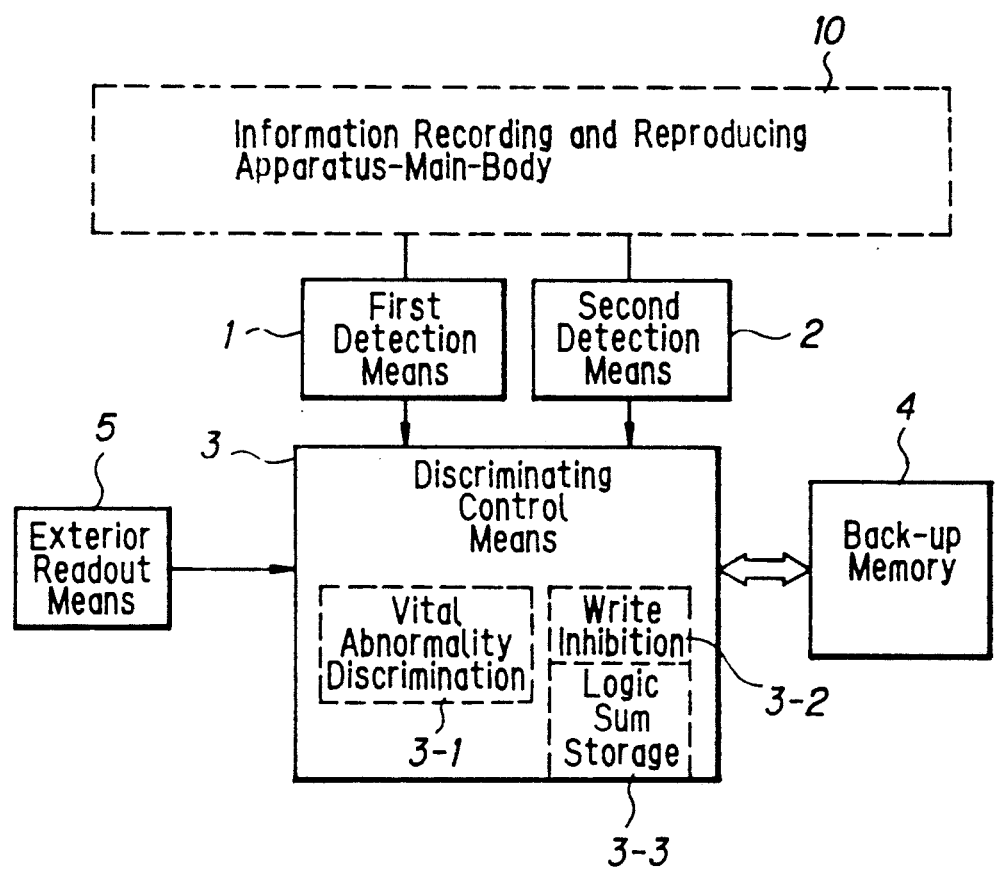
FIG. 1 is a block diagram showing a conceptual structure of an information recording and reproducing apparatus according to the present invention.
Figure 2:
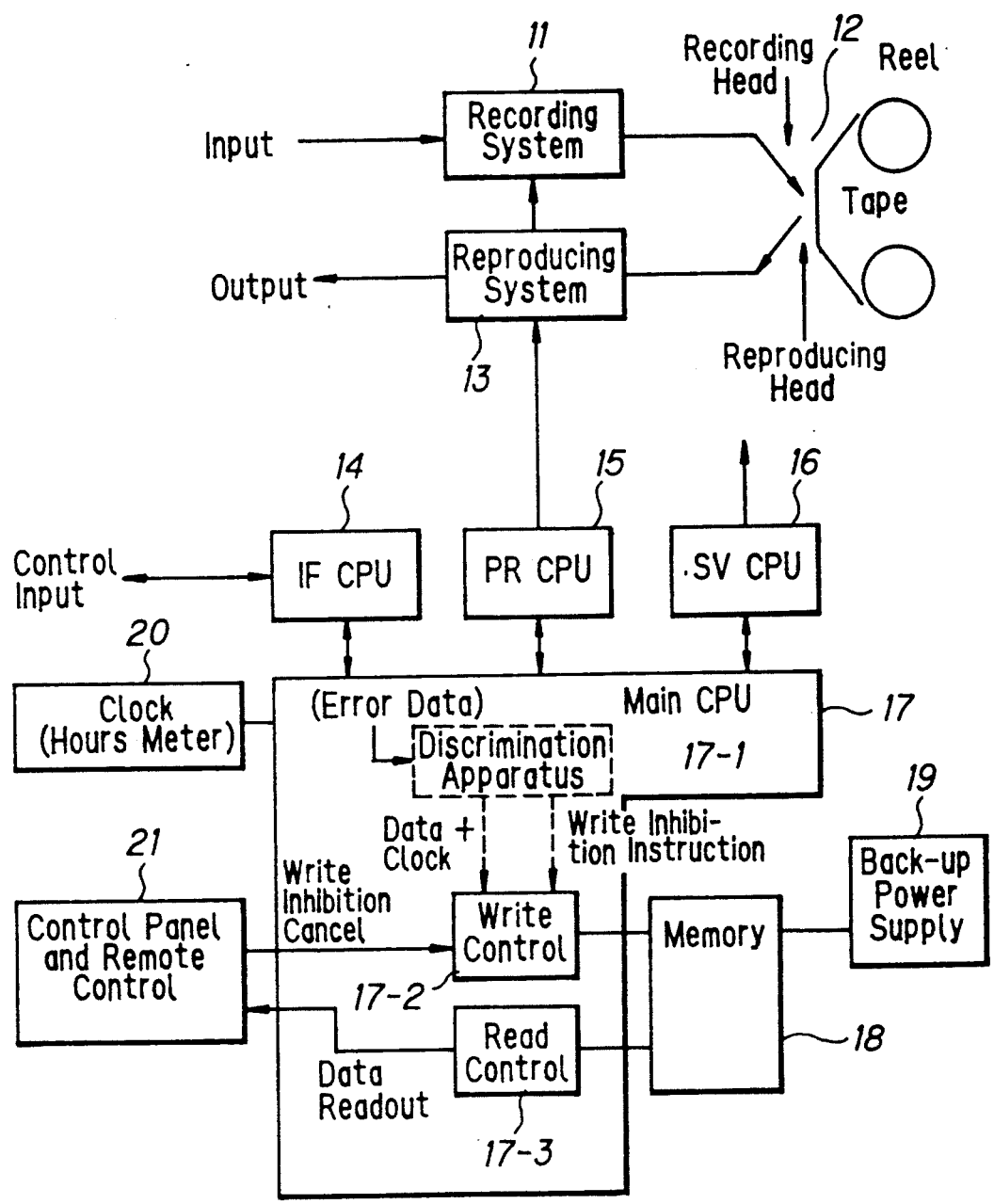
FIG. 2 is a block diagram showing one example of a hardware structure of on embodiment of the apparatus according to the present invention when the invention is applied to a data recorder.

FIG. 2 is a block diagram showing the hardware structure of the data recorder to which the present invention is applied as shown, reference numeral 11 designates a signal processing section of a recording system, reference numeral 12 designates a recording/reproducing mechanism section comprising a recording head, a playback head, a rotary drum on which the recording head and the playback head are mounted, a tape, reels, a tape drive mechanism (not shogun) and etc., and reference numeral 13 designates a signal processing section for a playback system, while four CPUs 14 to 17 are provided to control these sections. An input/output control CPU (IF CPU) 14 primarily processes control inputs for a remote control, etc., a signal processing control CPU (PR CPU) 15 primarily controls the signal processing sections, a drive section control CPU (SV CPU) 16 primarily carries out drive control of the mechanism section, servo control of the rotary drum, and servo control of the tape travelling, and a main CPU 17, in cooperation with the sub CPUs of each of the above CPUs, oversees overall operation, control, supervision and maintenance, etc. of the data recorder.

The main CPU 17, to prevent information from being lost when the main power supply is not connected to the data recorder, is provided with a memory apparatus (back-up memory) 18 to which power is supplied by a back-up power supply 19, and time information from a clock (hours meter) 20 and operation/control information from a control panel and remote control 21 are input thereto.

Each of the control sub-CPUs 14, 15 and 16 continually perform a self-diagnosis to determine whether each of the components being controlled is operating normally, and data regarding these results is collected as self-diagnosis information in the main CPU 17.

Of the collected self-diagnosis information, information showing abnormalities regarding the main apparatus and the tape and abnormalities in the input/output signals is called error data.

Below is a description of the self-diagnosis information recording operation according to the present invention.

The main CPU 17 rearranges the self-diagnosis information collected from the sub-CPUs 14, 15 and 16 into a bit-map of 1 piece of error data with a 1-bit flag, and supervises it at set times (e.g. one second every 27 minutes). As a result, by means of this set time supervision, if there is a change in the bit map, it is shown as an error having been generated.

In such self-diagnosis information, if a change occurs in the important flags previously assigned to the bit maps, they are written into the back-up memory 18. In this case, since changes to flags which have not been assigned are not recorded, all of the flags between recordings take a logic sum(OR). In this way, even if an error which has not been assigned a flag is generated between recordings and soon reverts, it is still recorded without fail.

The discrimination apparatus 17-1 within the main CPU 17 converts the collected error data in the following manner.

Data: data which has obtained the OR of the error data of a sampling (27 Hz) period.

Clock: a signal showing whether there has been a change in the important error data previously assigned during the sampling period by a data write instruction. For example, although this signal applies to most error data, error data showing such trivial errors such as cassette type is unsuitable; please extract cassette" is ignored here.

Write inhibition instruction: a signal showing when a previously determined vital error" has been generated. When this instruction is output, recording in the back-up memory is stopped until a write inhibition cancel operation is received from the control panel.

Thus write control function 17-2 is activated and error data is written into the back-up memory 18 in accordance with the above-described converted data and clock. Also, if the write inhibition instruction is generated, writing into the back-up memory 18 is inhibited under the control of the write control function 17-2.

By operating either the control panel or a remote control 21, the read control function 17-3 is activated and the written error data can be read out, while the write control function 17-2 is activated and write inhibition is canceled.

The discrimination apparatus 17-1 can be realized by software in the main CPU 17 but, in order to clearly explain this function, it will here be described with reference to FIG. 3 which shows an example using hardware.

Figure 3:
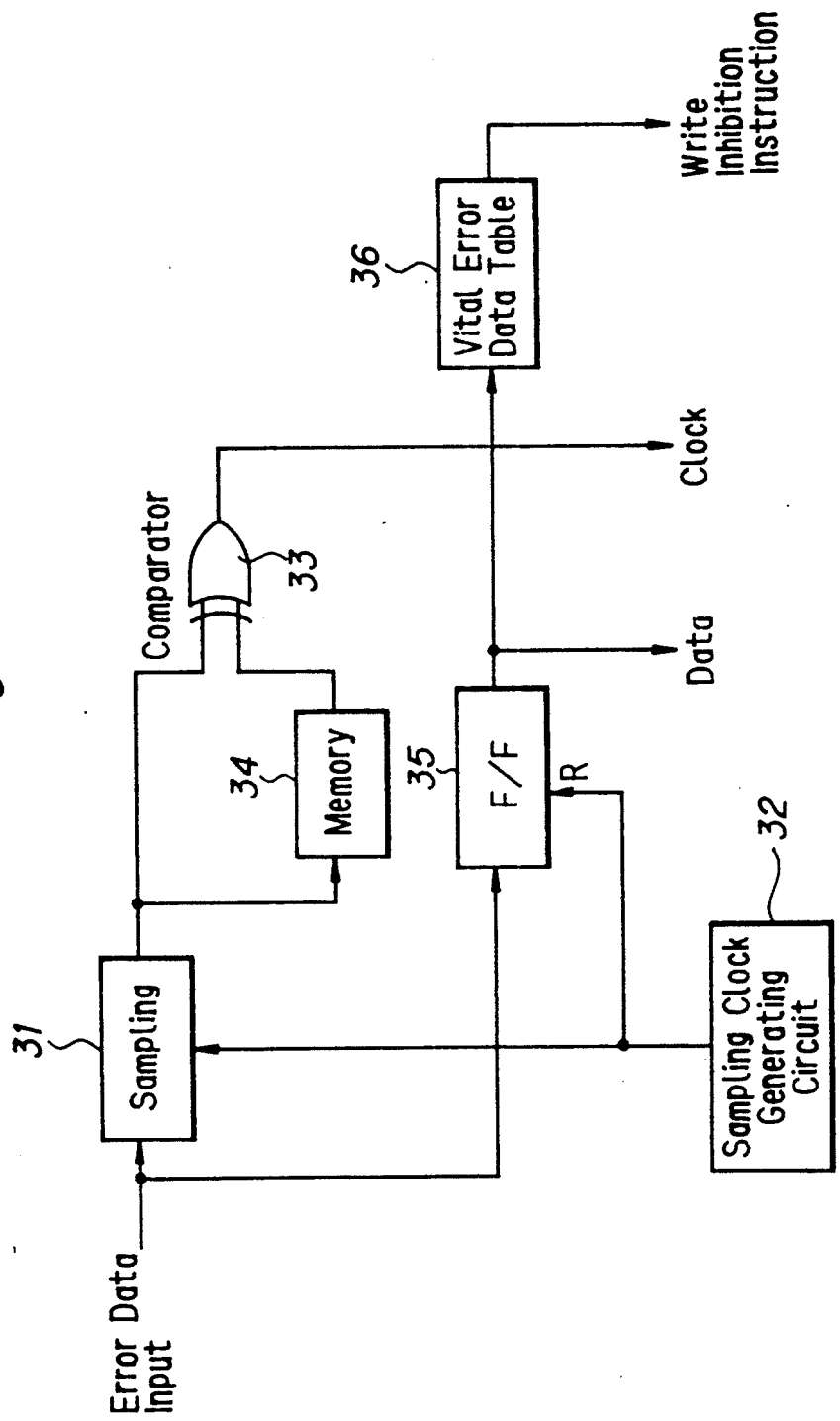
FIG. 3 is a block diagram of one example of an internal hardware structure of an internal hardware structure of a discrimination device according to the present invention.

FIG. 3 is a block diagram of the interior structure of the discrimination apparatus 17-1, in which reference numeral 31 designates a sampling circuit, reference numeral 32 designates a clock generating circuit, reference numeral 33 designates a comparator, reference numeral 34 designated a memory, reference numeral 35 designates a flip-flop (F/F), and reference numeral 36 designates a vital error data table. The clock generating circuit 32 generates a sampling clock which samples data, and the frequency of this clock, since the speed at which data is processed is 1 second every 27 minutes, is 27 Hz.

The memory 34 stores the error data of the first previous sample while the comparator 33 compares the output of this memory 34 with current data and detects whether there has been a data change. If there has been a change, a clock pulse for storing the data is output.

The flip-flop 35 is provided so that, if there is a momentary change to "1" and quickly back to "0" during the sampling period, such a change does not escape detection.

The vital error table 36 outputs a write inhibition instruction when a predetermined error flag becomes 1." A vital error is one the content of which is clearly an inability for further record/playback operation; for example, "tape not travelling," "drum not rotating," "power source abnormal," and "tape tension value abnormal" all correspond to such an error. In the case of a normal error, the record/playback operation is continued.

Due to the above structure, data written into the back-up memory 18 is, for example, of the following types.

All current error flags (5 bytes).

ID at time of generation (an identification signal such as a time code) (3 bytes).

Time generation: when a clock is built into the data recorder, the time indicated by the same, or current feeding time data of the data recorder, i.e. data from the hours meter 20 (3 bytes).

State of recorder at time of generation: for example, whether the servo has locked up during an operation mode (play, record, fast forward, rewind, etc.), whether input is being performed correctly, etc. (3 bytes).

Kind of CPU distinction reporting abnormalities (1 byte).

In order to store such data in the memory, in this example 16 bytes are used for one set of error data. In the back-up memory 18, the space allocated for storing this data is 1 kilobyte (1024 bytes), in which case the total number of times information can be stored is 1024/16=64 times.

If the memory becomes full, it returns to the first address and writes over the oldest information. Using the memory in this type of cycle, the condition of use of the memory at a given time is as shown in Table 1 below.

TABLE 1

| Memory Address | Data |
|---|---|
| 0 | 3rd previous data |
| 16 | 2nd previous data |
| 32 | 1st previous data |
| 48 | Newest data ... most recent error flag condition |
| 64 | Oldest data ... oldest data (next to be erased) |
| 80 | |
| 96 | |
| 112 | |
| | 5th previous data |
| 1008 | 4th previous data |

If it is taken that a vital error of the kind that stops the tape travelling has been generated, at this time the condition of the memory at that time is as shown in Table 2.

Thereafter, as well as the writing in of new information being stopped, the logic sum of a flag produced thereafter is written into the area of the flag of the next oldest data. In this way, it can at least be known whether any error has been generated afterwards. The condition of the memory in this case is as shown in Table 3.

That a vital error has been detected and the write inhibited, as well as that this is address 64 of the memory, is written into a separate section of the back-up memory.

TABLE 2

| Memory Address | Data |
|---|---|
| 0 | 4th previous data |
| 16 | 3rd previous data |
| 32 | 2nd previous data including currently generated "vital error" ↓ |
| 48 | 1st previous data |
| 64 | Newest data ... newest error flag condition |
| 80 | Oldest data ... oldest data (next to be erased) |
| 96 | |
| 112 | |
| | 6th previous data |
| 1008 | 5th previous data |

The case shown in Table 3 is that in which data is not renewed after a vital error has been generated and data thereafter is left only as the logic sum of the error flag, but if data is renewed for a predetermined period after the vital error is generated, and some information after the event is left, by scanning this information from before to after the generation abnormality, change in the data can be seen, and this is most effective for analyzing the cause of abnormality generation. A case wherein the data is renewed for a predetermined period after generation of a vital error in this manner is as shown in Table 4.

By approaching the problem in this way, in cases where a vital error is generated, error data before and after the event can be efficiently recorded without losing any data and without increasing the capacity of the memory. Also, the condition of the memory can be readout from the control panel or remote control whenever required.

TABLE 3

| Memory Address | Data |
|---|---|
| 0 | 4th previous data |
| 16 | 3rd previous data |
| 32 | 2nd previous data |
| 48 | 1st previous data |
| 64 | Newest data ... error flag condition at time of vital error generation |
| 80 | Subsequent data ... logic sums of subsequent error flags |
| 96 | Oldest data ... will not be erased |
| 112 | |
| | 6th previous data |
| 1008 | 5th previous data |

Here, if the data recorder fails, since the person maintaining the machine, by reading out the stored information, can know the content and time of the generated vital error, errors before the generation of the vital error, or the 62 errors which include some information after the occurrence of the vital error, the time, the place on the tape where the vital error occurred, the condition of the data recorder at the time, etc., it is possible for that person to quickly discover the cause of the failure.

If the abnormality disappears, by inputting a fixed command from the control panel, the write inhibition to the memory can be reset, and writing can be recommenced.

TABLE 4

| Memory Address | Data |
|---|---|
| 0 | 4th previous data |
| 16 | 3rd previous data |
| 32 | 2nd previous data |
| 48 | 1st previous data |
| 64 | Newest data ... error flag condition at time of vital error generation |
| 80 | 1st subsequent data (fixed period renewal recording) |
| 96 | 2nd subsequent data (fixed period renewal recording) |
| 112 | Subsequent data ... logic sums of error flags from 3rd data onward Oldest data ... will not be erased 6th previous data |
| 1008 | 5th previous data |

The function of storage control of the memory 18 and discrimination of the above-described error data can also be realized by software in the main CPU 17, one example of which is shown as a flow chart in FIG. 4.

When error data is introduced thereinto, it is first judged whether the write inhibition instruction to the memory 18 has been output (Step a), and if the answer is "No," i.e. a vital error has not been generated, it is then judged whether there is a predetermined important error (Step b). If "No," only the logic sum of the error flag is stored (Step f) and if "Yes," after again judging whether it is a vital error (Step c) and if the answer is "No," the normal error data storing step is entered, the data and time are stored (Step d), the address advanced (Step e), and the process returns to the original position and stands by to introduce the next error data.

If in Step c the answer is "Yes," i.e. if a vital error has occurred, the data and time thereof are stored (Step g), the address advanced (Step h) and the write inhibition instruction to the memory 18 generated (Step i). When this write inhibition instruction is generated, since the judgment in Step a is "Yes," only the logic sums of the error flags of subsequent error data are stored in Step f.

In addition, where the storage of the error data is performed with a predetermined time delay after a vital error is generated, the write inhibition instruction is generated (Step i) and at the same time, the clock for counting a predetermined period of time is reset (Step j) and of the error data generated thereafter, those generated within a predetermined time period are stored in Step k by the normal error data storage steps (Steps d and e) and after a lapse of predetermined time period, only the logic sum of the error flags is stored in Step f.

The above is a description of an embodiment of the present invention applied to the storage of system errors in a data recorder but the same type of apparatus can be considered with regard to "error rates" which indicate the quality of data read out from and written into tapes.

In the above case, data collected and monitored by the main CPU is the number of errors detected from playback data for each unit time period, and when the number of errors exceeds a predetermined value, the time of such occurrence, the ID, the condition of the recorder (record or play), etc. are stored in the memory. Then, if a vital error (system error) is generated, the write operation is stopped and thereafter only the maximum value of the error rate is stored.

It is also possible to store, a condition wherein the error rate is worse than a fixed value as one of system errors.

Although, in the instant embodiment, all the error flags are recorded as they are, compression of information is also possible by recording only the identification number of each of changed items so that the memory is further economized.

Further, although only a single-system backed up memory has been used here, it can also be used for a multiplicity of systems and in that case, if n-buffers were provided, after generation of a vital error, the resetting of n−1 times or the conditions of at the time of errors re-connection of the power supply can be stored. Consequently, it can be used for analysis of a case where a different place fails by reconnecting the power supply after the occurrence of the failure.

Although the present invention has been described with respect to an embodiment applied to a data recorder, it goes without saying that the present invention can be applied to all types of digital VTRs, DATs, optical disks, and the like.

As described above, according to the present invention, if a vital error is generated, the writing into the memory is inhibited, so that even if the user repeatedly reconnects the power supply thereafter, or takes the like steps, the original error information is not erased. Further, since the recording of medium and minor errors generated in the course of generation of the vital error is kept as it is, the invention is quite useful for troubleshooting.

In addition, also regarding errors occurring after the vital error, although the time information thereof is reduced, and since the logic sum of the error data and the time at which the error occurred last remain, the overall situation can be grasped to a certain extent. Further, since it is enough to mount only the minimum possible number of memories, the present invention is also effective in terms of miniaturization and cost reduction.

What is claimed is:

1. An information recording and reproducing apparatus having a self-diagnosis information storage mechanism for storing self-diagnosis information indicative of a result of self-diagnosis of operating conditions of each of sections constituting the apparatus and adapted to record and reproduce an information signal into and from a recording medium, which apparatus comprises:
   detection means for detecting abnormalities in each section of said information recording and reproducing apparatus and abnormalities in any signal recorded onto said recording medium and a signal reproduced from said recording medium, and outputting error data indicating a detection result;
   storage back-up means for storing said error data;
   discrimination/control means for determining whether or not the error data should be stored in said storage means in accordance with the error data outputted from said detection means, and for controlling a storage operation of said storage means; and
   control means for reading out the error data stored in said storage means from outside in order to make sure of abnormalities in said information recording and reproducing apparatus, recording signals and reproducing signals, and
   wherein said discrimination/control means operates such that when said error data shows an occurrence of an abnormality vital to said information recording and reproducing apparatus, storage of subsequent error data is inhibited and as regards such storage-inhibited error data, a logic sum of only data incident thereto is stored.

2. An information recording and reproducing apparatus according to claim 1, wherein, with respect to the error data output from said detection means said discrimination/control means processes one of said abnormalities in the form of a 1-bit flag, determines whether or not said error data should be stored in said storage means on the basis of whether there is a change in a previously designated flag, and with respect to error data which has been determined not to be stored, a logic sum of a flag incident thereto is stored in said storage means.

3. An information recording and reproducing apparatus according to claim 1, wherein said detection means comprises first detection means for detecting abnormalities in a main body of said information recording and reproducing apparatus and second detection means for detecting abnormalities in signals to be recorded on said recording medium and signals reproduced from said recording medium.

4. An information recording and reproducing apparatus according to claim 1, wherein said control means generates an instruction signal for canceling write inhibition of said error data to said storage means.

5. An information recording and reproducing apparatus having a self-diagnosis information storage mechanism for storing self-diagnosis information indicative of a result of self-diagnosis of operating conditions of each of sections constituting the apparatus and adapted to record and reproduce an information signal into and from a recording medium, which apparatus comprises:
   detection means for detecting abnormalities in each section of said information recording and reproducing apparatus and abnormalities in any signal recorded onto said recording medium and a signal reproduced back from said recording medium, and outputting error data indicating a detection result;
   storage back-up means for storing said error data;
   discrimination/control means for determining whether or not the error data should be stored in said storage means in accordance with the error data outputted from said detection means and for controlling a storage operation of said storage means; and control means for reading out the error data stored in said storage means from outside in order to make sure of abnormalities in said information recording and reproducing apparatus, recording signals, and reproducing signals; and wherein said discrimination/control means, operates such that when said error data shows an occurrence of an abnormality vital to said information recording and reproducing it stores said error data for a predetermined period of time and then inhibits the storage of subsequent error data and as regards the storage inhibited error data, a logic sum of only those data incident thereto is stored.

6. An information recording and reproducing apparatus according to claim 5, wherein, with respect to the error data output from said detection means, said discrimination/control means processes one of said abnormalities in the form of a 1-bit flag, determines whether or not said error data should be stored in said storage means on the basis of whether or not there is a change in a previously designated flag, and with respect to error data which has been determined not to be stored, a logic sum of a flag incident thereto is stored in said storage means.

* * * * *